United States Patent
Brizzy

(10) Patent No.: US 12,403,554 B2
(45) Date of Patent: Sep. 2, 2025

(54) CLEANING SHEATH FOR POWER TOOLS WITH CUTTING BLADES AND METHODS OF USING

(71) Applicant: Richard Brizzy, Hunlock Creek, PA (US)

(72) Inventor: Richard Brizzy, Hunlock Creek, PA (US)

( * ) Notice: Subject to any disclaimer, the term of this patent is extended or adjusted under 35 U.S.C. 154(b) by 179 days.

(21) Appl. No.: 18/123,270

(22) Filed: Mar. 18, 2023

(65) Prior Publication Data
US 2024/0033872 A1 Feb. 1, 2024

Related U.S. Application Data

(63) Continuation-in-part of application No. 17/873,376, filed on Jul. 26, 2022.

(51) Int. Cl.
*B23Q 13/00* (2006.01)
*B27B 17/02* (2006.01)
*B27G 19/00* (2006.01)

(52) U.S. Cl.
CPC .............. *B23Q 13/00* (2013.01); *B27B 17/02* (2013.01); *B27G 19/003* (2013.01)

(58) Field of Classification Search
CPC ......... B27B 17/02; B27B 17/00; B23Q 11/02; B23Q 13/00; B27G 19/003; A45F 3/00; A45F 5/00
USPC .......................................................... 30/232
See application file for complete search history.

(56) References Cited

U.S. PATENT DOCUMENTS

| | | | |
|---|---|---|---|
| 3,042,087 A | 7/1962 | Otoupalik | |
| 5,489,051 A * | 2/1996 | Robinson | A45F 5/02 220/570 |
| 6,219,921 B1 | 4/2001 | Pettersson | |
| 8,783,538 B1 * | 7/2014 | Dattilo | A45F 5/021 224/679 |
| 8,887,940 B2 * | 11/2014 | Kiceniuk, Jr. | B44D 3/127 248/339 |
| 2019/0090716 A1 * | 3/2019 | Martinez | A47L 1/06 |
| 2021/0059390 A1 * | 3/2021 | Knoblauch | B25H 3/022 |
| 2022/0304458 A1 * | 9/2022 | Davis | B08B 1/32 |
| 2024/0108120 A1 * | 4/2024 | Knoblauch | A45F 5/021 |

FOREIGN PATENT DOCUMENTS

WO WO-2007141775 A2 * 12/2007 ............. A47L 13/58

* cited by examiner

*Primary Examiner* — Nhat Chieu Q Do
(74) *Attorney, Agent, or Firm* — James R. McDaniel

(57) ABSTRACT

A cleaning sheath for power tools, including a sheath assembly, wherein the sheath assembly includes a sheath, and wherein the sheath is rigid, the sheath is made of an impermeable material, and the sheath is hollow, a lid assembly located at one end of the sheath, a loop assembly located adjacent to the lid assembly, a cleaning solution located within a portion of the sheath, wherein the cleaning solution is adapted to clean and disinfect power tool blades located within the sheath, and an attaching assembly, wherein the attaching assembly includes an attaching element, and wherein the attaching element is removably attached to the sheath, and the attaching element is removably attached to predetermined surfaces.

11 Claims, 5 Drawing Sheets

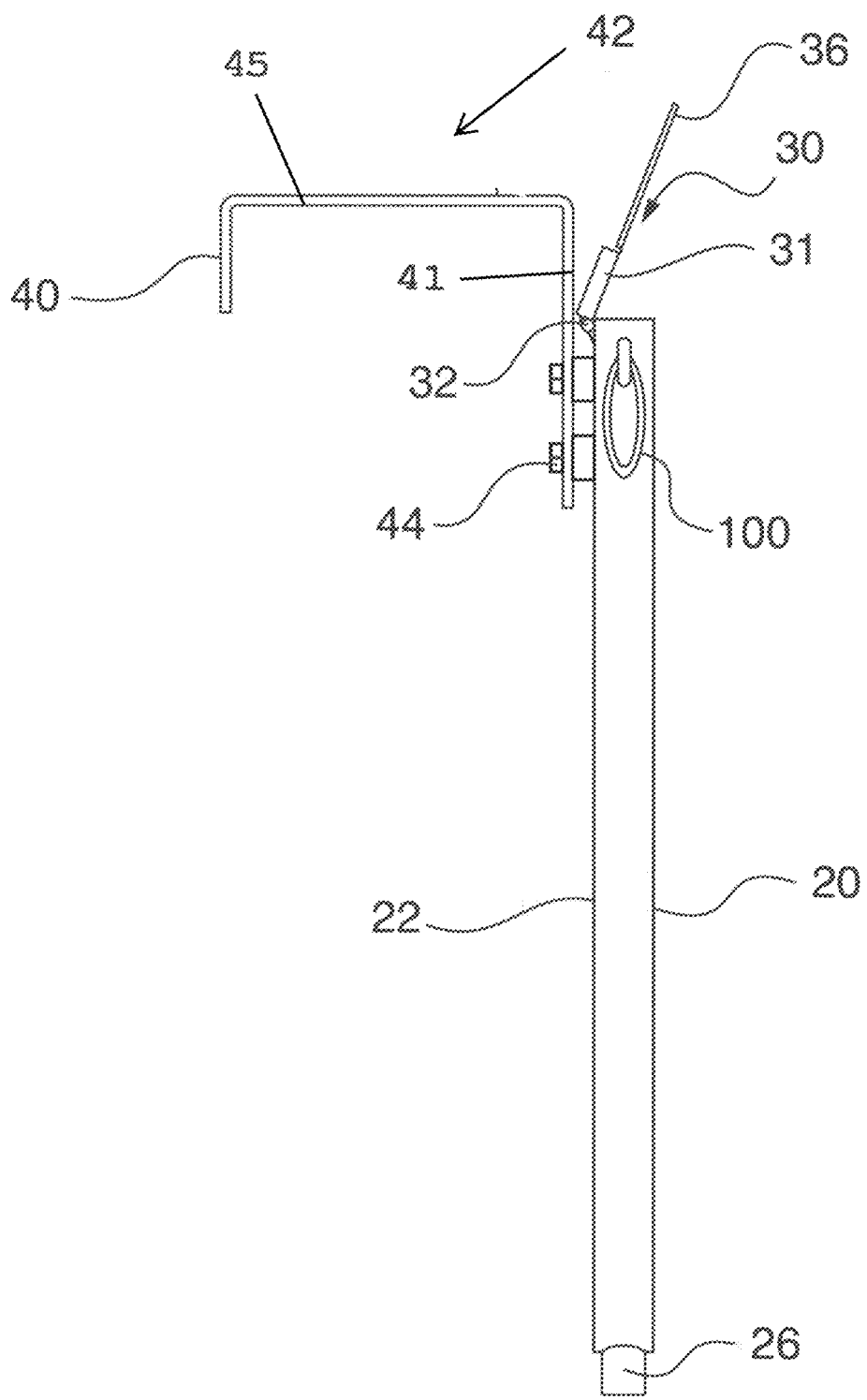

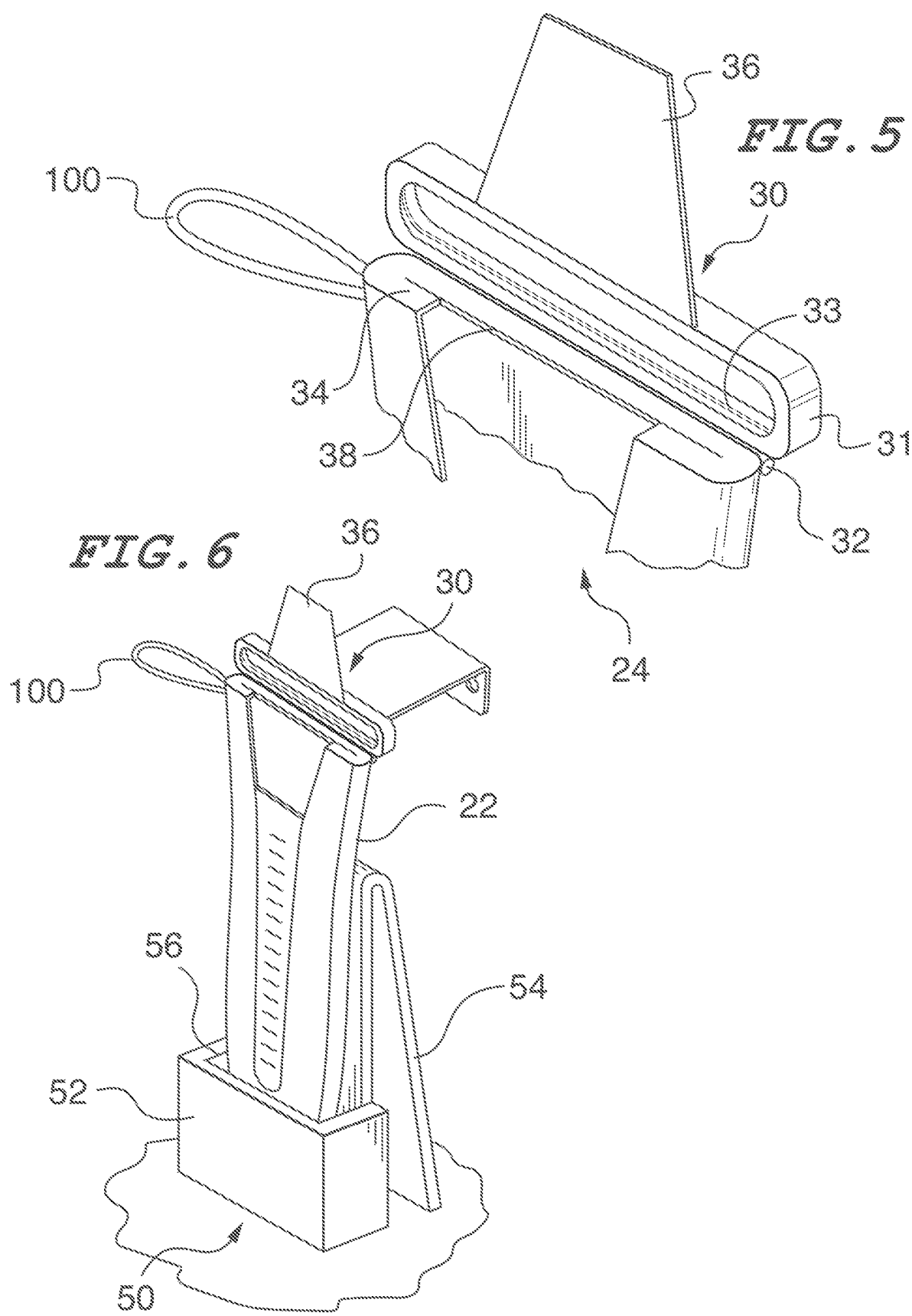

CLEANING SHEATH FOR POWER TOOLS WITH CUTTING BLADES AND METHODS OF USING

CROSS-REFERENCE TO RELATED APPLICATION

This application is a continuation-in-part of U.S. patent application Ser. No. 17/873,376, filed on Jul. 26, 2022, the disclosure of which is hereby incorporated by reference in its entirety to provide continuity of disclosure to the extent such a disclosure is not inconsistent with the disclosure herein.

BACKGROUND OF THE INVENTION

Field of the Invention

The present invention relates to a cleaning sheath for power tools with cutting blades and, more particularly, to a cleaning sheath for power tools with cutting blades that allows to easily clean the blades after utilizing the power tool through the use of mineral spirits.

Description of the Related Art

Several designs for cleaners for power tools have been designed in the past. None of them, however, include a sheath where a power tool with cutting blades can be cleaned.

The applicant believes that a related reference corresponds to U.S. Pat. No. 3,042,087 issued for a protective sheath for the blade of a chainsaw. The applicant believes that another related reference corresponds to U.S. Pat. No. 6,219,921 issued for a chainsaw guide bar with an internal channel that is configured to receive a cleaning liquid. None of these references, however, teach or suggest a cleaning apparatus for power tools with rotating or reciprocating blades such as chainsaws or hedge trimmers that is comprised of a rigid, liquid impermeable sheath which is filled with a cleaning solution and configured to receive the blade of the tool such that the blade can be soaked and agitated in the cleaning solution. Furthermore, none of these references teach or suggest the providing the cleaning apparatus for power tools with rotating or reciprocating blades or guide bars with a splash resistant lid, a drain located at the bottom of the cleaning apparatus, a window or other similar viewing device on the cleaning apparatus that allows the user to see level of the cleaning solution in the cleaning apparatus, and a stand for retaining the cleaning apparatus in an upright position.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cleaning sheath for power tools that includes fasteners to fix the cleaning sheath to any suitable surface.

It is another object of this invention to provide a cleaning sheath for power tools that includes an attaching element that allows to removably attach the cleaning sheath to working benches or any other suitable surface.

It is still another object of the present invention to provide a cleaning sheath for power tools that includes an impermeable sheath to store cleaning liquid therein.

It is still another object of the present invention to provide a cleaning sheath that includes a splash resistant lid.

It is still another object of the present invention to provide a cleaning sheath that includes a drain located at the bottom of the cleaning apparatus for assisting in removing the cleaning fluid from the cleaning sheath.

It is still another object of the present invention to provide a cleaning sheath that includes a window or other similar viewing device on the cleaning apparatus that allows the user to see level of the cleaning solution in the cleaning apparatus.

It is still another object of the present invention to provide a cleaning sheath that includes a stand for retaining the cleaning apparatus in an upright position.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a representation of a left side view of the present invention 10.

FIG. 5 is a schematic illustration of the lid assembly 30 of the present invention 10.

FIG. 6 is a schematic illustration of the present invention 10 being retained in a stand assembly 50.

DETAILED DESCRIPTION OF THE EMBODIMENTS OF THE INVENTION

Figure 1:
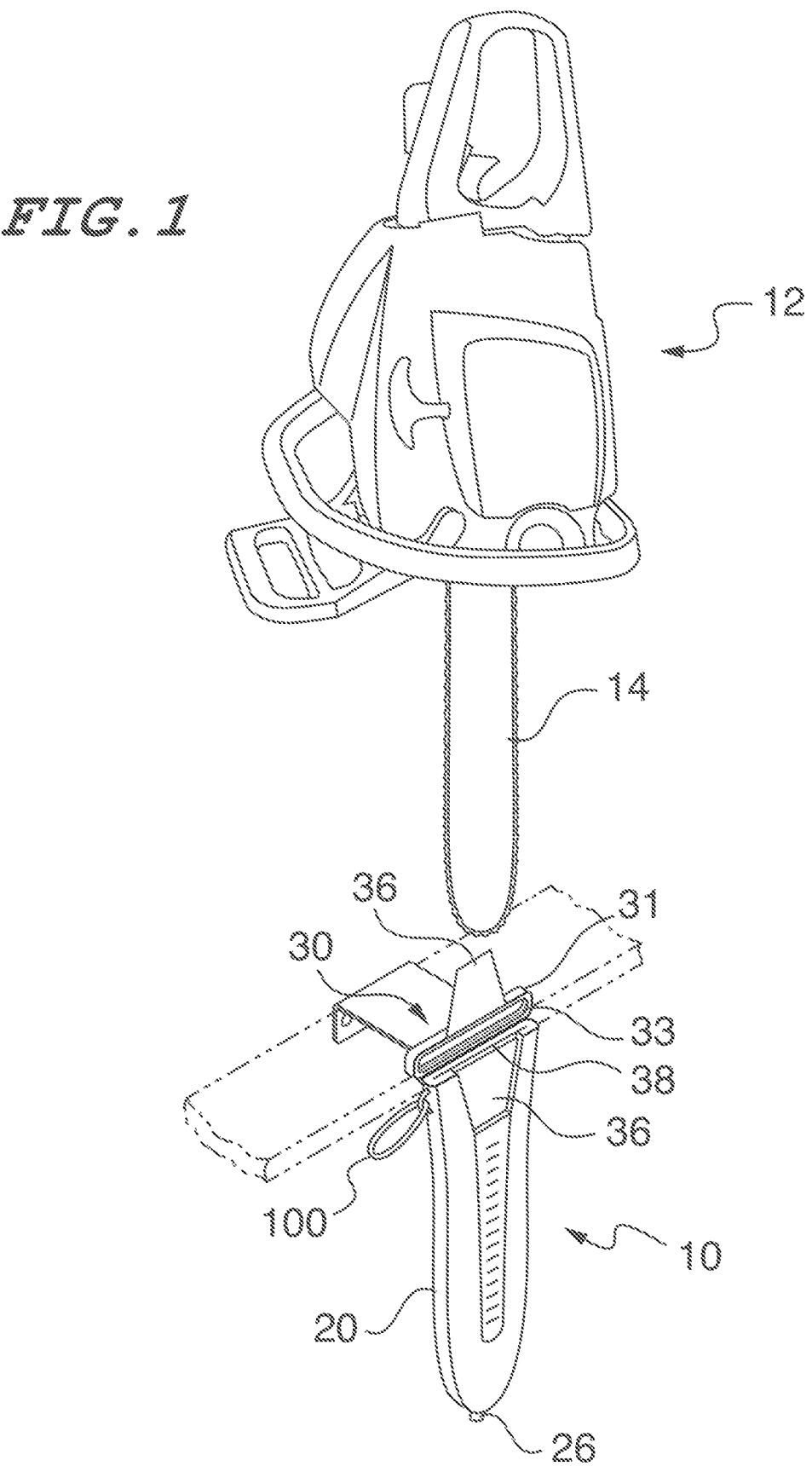
FIG. 1 represents an isometric operational view of the present invention 10 fixed to a working bench.

Referring now to the drawings, where the present invention is generally referred to with numeral 10, it can be observed that it basically includes power tool 12 having an elongated tool extension 14 such as a guide bar, sheath assembly 20, a lid assembly 30, an attaching assembly 40, and a stand assembly 50. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
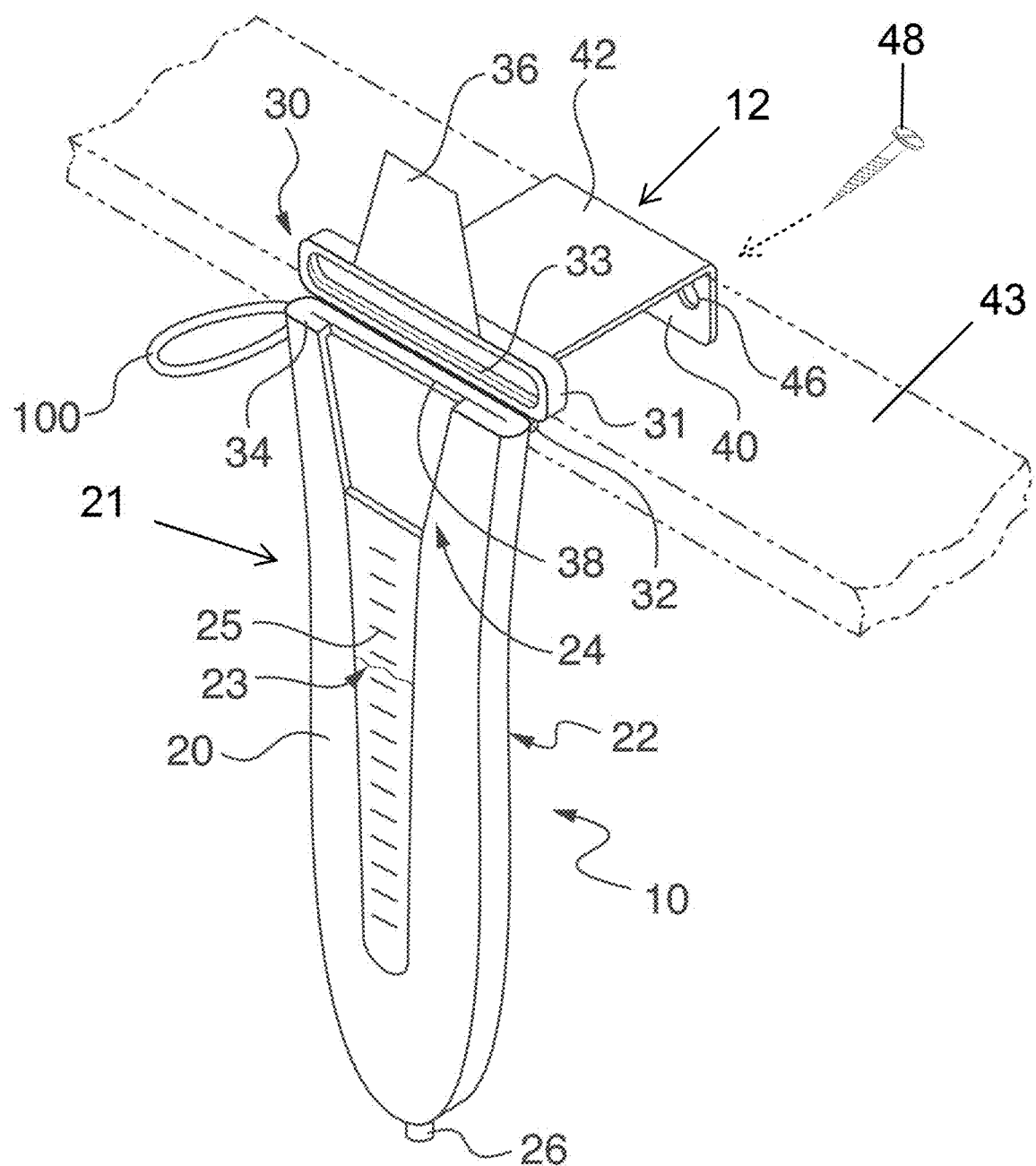
FIG. 2 shows an isometric view of the present invention 10. The present invention includes a sheath assembly 20 and an attaching assembly 40.
Figure 3:
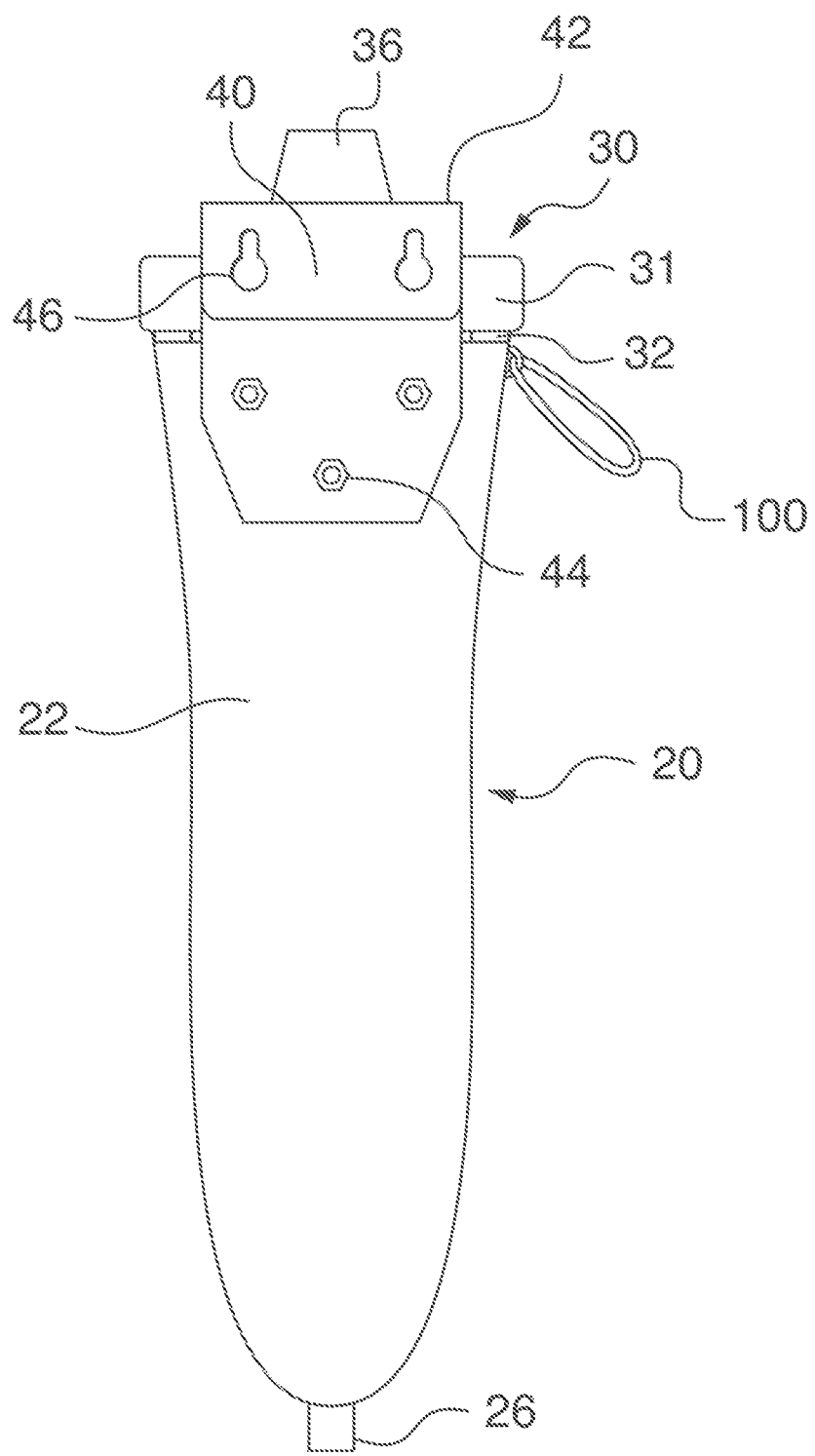
FIG. 3 illustrates a rear view of the present invention 10.

As shown in FIGS. 2-4, the sheath assembly 20 may include a sheath 22. In a preferred embodiment the sheath 22 may be made of metal. It also may be suitable for the sheath 22 to be made of plastic, ceramic, wood, leather, or any other suitable material. The sheath 22 may have an anti-rust layer located on the exterior and interior of the sheath. The sheath 22 may substantially have a rectangular shape with rounded tip. It also may be suitable for the sheath 22 to have a triangular shape, a curved shape, a circular shape, or any other suitable shape. The shape of the sheath 22 may preferably adjust to the shape of power tools with rotating or reciprocating blades. An upper portion of the sheath 22 may be bigger in length than the lower portion of the sheath 22 to allow an easier introduction of power tools with rotating or reciprocating blades and avoiding the spill of liquids. The sheath 22 may be hollow. The uppermost end of the sheath 22 may have an opening 24. The opening 24 of the uppermost end of the sheath 22 may have an extension that allows predetermined sized power tools with rotating or reciprocating blades or guide bars to fit thereinto.

Cleaning solutions such as, but not limited to, mineral spirits may be deposited into the sheath 22 to clean power tools with rotating or reciprocating blades. The mineral spirits may also be used to disinfect the power tools with rotating or reciprocating blades or guide bars. In a preferred embodiment the power tools are hedge trimmers. It should be understood that the power tools with rotating or reciprocating blades or guide bars 14 may also include but are not limited to smaller chainsaws and band pruners. In a preferred embodiment, a power tool with rotating or reciprocating blades may be inserted and actuated into the amount 26 of solution of mineral spirits inside the sheath 22 to be cleaned. It also may be suitable to place different blade tools or any metal tools to be cleaned into the sheath 22. Blade tools include but are not limited to hand shears, machetes, and loppers. It also may be suitable to use the sheath 22 for leaving the power tools or any metal tool into the amount 23 of cleaning fluid (e.g., mineral spirits) to be cleaned overnight. The sheath 22 may also be used to store and protect blades or guide bars 14, power tools with rotating or reciprocating blades or swords. The sheath 22 may be attached or fixed to a predetermined surface by means of the attaching assembly 40.

Referring now to the FIG. 3 it can be observed that the attaching assembly 40 may include an attaching element 42, junction elements 44, openings 46 and at least one fixing element 48. The attaching element 42 may have a front wall 41, a top wall 45, and a rear wall 40. The front wall 41 of the attaching element 42 may be planar. The front wall 41 of the attaching element 42 may be removably attached to the sheath 22 through the junction elements 44. The junction elements 44 may be nuts and bolts, screws, or any other suitable element that allows joining the attaching element 42 to the back of the sheath 22. The front wall 41 may be attached to the top wall 45 of the attaching element 42. The top wall 45 of the attaching element 42 may have a predetermined length. The predetermined length of the top wall 45 of the attaching element may depend on the extension of a predetermined surface of a structure 43 where the sheath 22 is being attached. The rear wall 40 of the attaching element 42 may include openings 46. The attaching element 42 may be used to removably attach the sheath 22 to predetermined structures such as a work bench. The top wall 45 and the rear wall 40 of the attaching element 42 may be planar. The rear wall 40 of the attaching element 42 may be a bent portion of the top wall 45 of the attaching element 42. The attaching element 42 may be made of metal, plastic, ceramic, wood, leather, or any other suitable material.

The at least one fixing element 48 may be used to fix the attaching element to predetermined surfaces. The at least one fixing element 48 may go through the openings 46. The at least one fixing element 48 may be inserted into a surface. The openings 46 may transversely go through the rear wall of the attaching element 42. The at least one fixing element 48 may be nuts and bolts, screws, hook and loop fasteners, suction cups, or any other suitable fixing element. The at least one fixing element 48 may be used to prevent movement of the sheath 22 when a power tool with rotating or reciprocating blades or guide bars 14 is inserted and actuated into the sheath 22.

A unique aspect of the present invention is that sheath 22 can also include a splash resistant lid assembly 30. As shown in FIGS. 1-5, lid assembly 30 includes, in part, lid 31, lid hinge 32, lid gasket 33, lid retainer 34, lid extension 36, opening 38, and loop assembly 100. Preferably, lid 31, lid hinge 32, lid gasket 33, lid retainer 34, and lid extension 36 are constructed of any suitable, durable, UV resistant, high strength, chemical resistant polymeric material. Preferably, loop assembly 100 is constructed of any suitable, durable, UV resistant, high strength, chemical resistant material.

In one embodiment, opening 38 is formed in lid retainer 34 by conventional forming techniques such as molding, stamping, forming, or the like. As discussed above, opening 38 is formed in lid retainer 34 so that the cleaning solution is not able to easily splash out of or otherwise able to escape sheath 22 while allowing the rotating or reciprocating blades or guide bars 14 to be inserted into sheath 22. Furthermore, opening 38 is located in lid retainer 34 so that when the power tool 12 is extracted or otherwise removed from sheath 22, the sides of opening 38 will interact with the sides of the rotating or reciprocating blades or guide bars 14 of the power tool 12 in order to remove an excess cleaning solution located on the rotating or reciprocating blades or guide bars 14 of the power tool 12.

Another unique aspect of the present invention is that sheath 22 can also include a drain 26 located at the bottom of the cleaning apparatus for assisting in removing the cleaning fluid 23 from the sheath 22. In one embodiment, the drain 26 can be a stop cock style drain, a plug style drain, or any suitable style of drain as long as the drain 26 will allow the cleaning fluid 23 to properly drain from the sheath 22.

A still another unique aspect of the present invention is that sheath 22 includes a window 21 or other similar viewing device that allows the user to see level of the cleaning fluid 23 in the sheath 22. The window 21 can be attached to the sheath 22 by conventional attachment techniques such as adhesives or the like. In one embodiment, the window 21 should be constructed of any suitable, durable, UV resistant, chemical resistant, transparent polymeric material. In another embodiment, the window 21 can include a series of markings or graduations 25 that will assist the user is determining the amount of cleaning fluid 23 in the sheath 22.

A still another unique aspect of the present invention is that sheath 22 includes a stand assembly 50 for retaining the cleaning apparatus in an upright position. As shown in FIG. 6, in one embodiment, the stand assembly 50 includes a plurality of walls 52 and stand 54 and an opening 56. Preferably, walls 52 and stand 54 are constructed of any suitable, durable, high-strength, UV resistant, chemical resistant material. Also, the walls 52 and stand 54 are secured together by conventional techniques such as fasteners, adhesives or the like. The opening 56 is formed when walls 52 are conventionally attached together by conventional techniques such as adhesives, fasteners, or the like. As shown in FIG. 6, sheath 22 is retained in opening 56 of stand assembly 50. In this manner, sheath 22 can be easily stored in an upright position.

A still further unique aspect of the present invention is loop assembly 100. As shown in FIGS. 1-3, 5 and 6, loop assembly 100 is conventionally attached to sheath 22 at a location that is adjacent to the lid 31. In this manner, loop assembly 100 can be used to attach the sheath 22 to a conventional utility belt (not shown) so that the sheath 22 can be carried by the user in a hand-free manner.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What I claim is:

1. A cleaning and disinfecting system, comprising:
   a sheath, wherein the sheath is rigid, wherein the sheath is made of an impermeable material, and wherein the sheath is hollow;
   a cleaning and disinfecting solution located within a portion of the sheath, and wherein the cleaning and disinfecting solution includes mineral spirits;
   a power tool having power tool blades, wherein the power tool blades are retained within a portion of the sheath, and wherein the power tool blades interact with the cleaning and disinfecting solution to clean and disinfect the power tool blades;
   a lid assembly located at one end of the sheath, wherein the lid assembly is further comprised of;
   a lid,
   a lid hinge rotatably connected to the lid and the one end of the sheath,
   a lid retainer, wherein a first opening is located in the lid retainer, wherein sides of the first opening are configured to interact with sides of the power tool blades in order to remove an excess of the cleaning and disinfecting solution located on sides of the power tool blades,
   a lid gasket located on a first side of the lid, and
   a lid extension located on one edge of the lid; and
   an attaching assembly, wherein the attaching assembly includes an attaching element such that the attaching element is removably attached to the sheath, and the attaching element is configured to be able to be removably attached to a structure.

2. The cleaning and disinfecting system, as in claim 1, wherein the attaching element is further comprised of:
   at least one first fastener, wherein the at least one first fastener is configured to allow the attaching element to be removably attached to the sheath.

3. The cleaning and disinfecting system, as in claim 1, wherein the sheath is further comprised of:
   a second opening, wherein the second opening is configured to fit the power tool blades thereinto.

4. The cleaning and disinfecting system, as in claim 1, wherein the attaching element is further comprised of:
   a first wall;
   a second wall connected to the first wall; and
   a third front wall connected to the first wall and located predetermined distance away from the second wall.

5. The cleaning and disinfecting system, as in claim 4, wherein the third wall is removably attached to the sheath.

6. The cleaning and disinfecting system, as in claim 4, wherein the second wall has a plurality of third openings.

7. The cleaning and disinfecting system, as in claim 6, wherein the attaching assembly is further comprised of:
   at least one second fastener, wherein the at least one second fastener is located within the at least one of the plurality of third openings to attach the sheath to the structure.

8. The cleaning and disinfecting system, as in claim 1, wherein the power tool blades are further comprised of:
   hedge trimmer blades.

9. The cleaning and disinfecting system, as in claim 1, wherein the sheath assembly is further comprised of:
   a loop assembly connected to the sheath adjacent to the lid assembly.

10. The cleaning and disinfecting system, as in claim 1, wherein the sheath assembly is further comprised of:
    a window located along a portion of the sheath; and
    a plurality of markings located on the window.

11. The cleaning and disinfecting system, as in claim 1, wherein the cleaning sheath is further comprised of:
    a stand for holding the sheath in an upright position.

* * * * *